(12) United States Patent
Xie et al.

(10) Patent No.: US 9,384,350 B2
(45) Date of Patent: *Jul. 5, 2016

(54) SIGNATURE COMPILATION ON A SECURITY DEVICE

(71) Applicant: Palo Alto Networks, Inc., Santa Clara, CA (US)

(72) Inventors: Huagang Xie, Pleasanton, CA (US); Song Wang, Palo Alto, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/547,103

(22) Filed: Nov. 18, 2014

(65) Prior Publication Data

US 2015/0150136 A1     May 28, 2015

Related U.S. Application Data

(63) Continuation of application No. 13/753,353, filed on Jan. 29, 2013.

(51) Int. Cl.
*H04L 9/00*     (2006.01)
*G06F 21/56*     (2013.01)

(52) U.S. Cl.
CPC .............. *G06F 21/564* (2013.01); *G06F 21/56* (2013.01); *G06F 21/566* (2013.01); *G06F 21/567* (2013.01)

(58) Field of Classification Search
CPC ................ G06F 21/562–21/567; G06F 21/56; H04L 63/145; H04L 63/1416
USPC .................................. 726/4, 22–26
See application file for complete search history.

(56) References Cited

U.S. PATENT DOCUMENTS

| | | | |
|---|---|---|---|
| 7,854,008 B1* | 12/2010 | Huang et al. | 726/24 |
| 2006/0130141 A1* | 6/2006 | Kramer et al. | 726/23 |
| 2009/0320133 A1* | 12/2009 | Viljoen et al. | 726/24 |

* cited by examiner

*Primary Examiner* — Kambiz Zand
*Assistant Examiner* — Noura Zoubair
(74) *Attorney, Agent, or Firm* — Van Pelt, Yi & James LLP

(57) ABSTRACT

Signature compilation on a security device is disclosed. A first set of malware signatures is received. The first set of signatures is compiled at a first time. A second set of malware signatures is received. The second set of signatures is compiled at a second time that is different from the first time. A determination of whether a file is malicious is made based at least in part by performing a scan using the first and second compiled signatures.

18 Claims, 4 Drawing Sheets

SIGNATURE COMPILATION ON A SECURITY DEVICE

CROSS REFERENCE TO OTHER APPLICATIONS

This application is a continuation of co-pending U.S. patent application Ser. No. 13/753,353, entitled SIGNATURE COMPILATION ON A SECURITY DEVICE filed Jan. 29, 2013 which is incorporated herein by reference for all purposes.

BACKGROUND OF THE INVENTION

Nefarious individuals attempt to compromise computer systems in a variety of ways. As an example, unsuspecting users may download or otherwise obtain software that purports to be useful (e.g., a game) when in fact, the software contains malicious elements (i.e., is or contains "malware"). Unfortunately, malware authors are crafting increasingly sophisticated malware that is increasingly able to evade detection. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
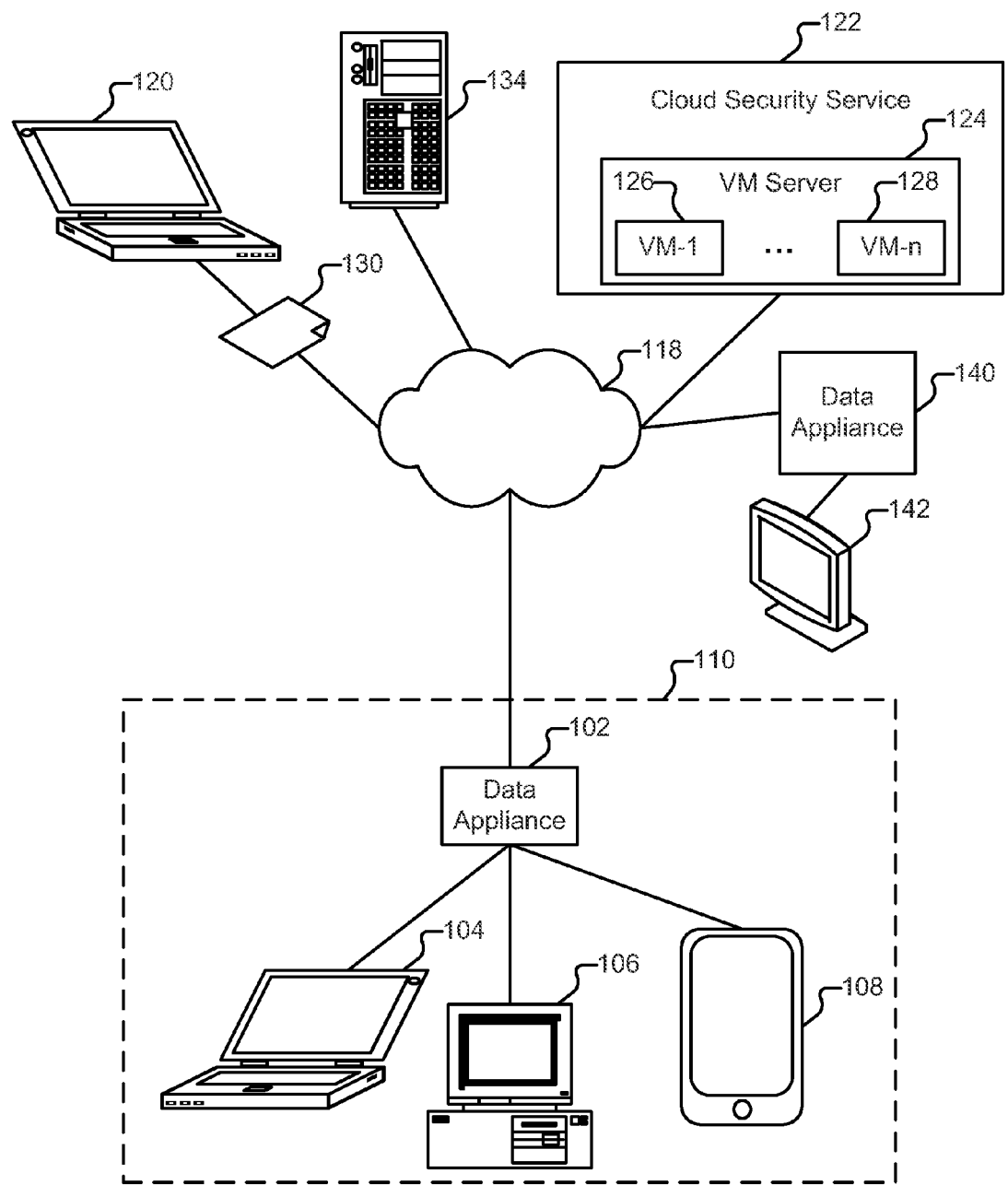
FIG. 1 illustrates an embodiment of an environment in which files are scanned for security threats.

FIG. 1 illustrates an embodiment of an environment in which malware is detected. In the example shown in FIG. 1, client devices 104-108 are a laptop computer, a desktop computer, and a tablet (respectively) present in an enterprise network 110. Data appliance 102 is configured to enforce policies (424) regarding communications between clients, such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110.

One task performed by appliance 102 is the scanning of files to determine whether they are malicious. As will be described in more detail below, appliance 102 is configured to receive signatures of known-malicious files, and to use those signatures in performing its security scans. As shown in FIG. 1, appliance 102 receives signatures from two sources—update server 134 (which also provides other types of updates to appliance 102, such as software and firmware updates) and cloud security service 122, which provides signatures as a subscription service to appliance 102 and other appliances (e.g., appliance 140). In various embodiments, appliance 102 receives signatures from additional sources (i.e., more than two) and/or different types of signature providers (in addition to or instead of update server 134 and cloud security service 122), and the techniques described herein are adapted as needed. Further, the signature sources (e.g., update server 134 and cloud security service 122) can be, but need not be, operated by the same entity. In some embodiments, different signature sources are operated by different entities. For example, update server 134 can be operated by the manufacturer of appliance 102, while service 122 is provided by a third party.

Both update server 134 and cloud security service 122 send updates to appliance 102 on a recurring basis. However, the number of signatures included in the respective updates, and the timing of the transmissions may be different. In the example shown in FIG. 1, update server 134 is configured to send a set of one million signatures to appliance 102 once a day (e.g., replacing/refreshing the set of one million signatures received the previous day). Cloud security service 122 is configured to send one hundred thousand signatures to appliance 102 every thirty minutes. In various embodiments, the period used by one or the other update sources varies (or both), and can also be associated with the occurrence of an event. As an example, update server 134 may send updates to appliance 102 daily, on a regular schedule, while cloud security service 122 sends updates to appliance 102 on demand, or in response to an event occurring (e.g., a malicious file being transmitted by appliance 140 to service 122 for analysis). As will be described in more detail below, appliance 102 is configured to separately compile the updates it receives from the two sources (i.e., update server 134 and cloud security service 122) and use the separately compiled signatures in detecting malicious files.

As shown, cloud security service 122 is configured to work in cooperation with one or more virtual machine servers (124) to perform real-time malware analysis. As one example, data appliances (e.g., appliances 102 and/or 140) can be configured to provide copies of files to cloud security service 122 for analysis (e.g., when files are received for which no signatures are present). If the cloud security service determines that a received file is malicious, cloud security service 122 can generate a signature for the file (e.g., a 24-byte signature) and include the signature in the next update it sends to its subscribers.

An example of a virtual machine server is a physical machine comprising commercially available server-class hardware (e.g., a multi-core processor, 4+ Gigabytes of RAM, and one or more Gigabit network interface adapters) that runs commercially available virtualization software, such as VMware ESXi, Citrix XenServer, or Microsoft Hyper-V.

A virtual machine (VM) can be used to execute a candidate malware application (e.g., in a VM sandbox environment). Behavior profiling using various heuristic-based analysis techniques and network traffic analysis associated with the application can be performed. As one example, suppose a malicious user of host 120 attempts to send a user of client 104 an email message that includes as an attachment a malicious executable (e.g., having a .exe extension). Data appliance 102 can determine whether a signature for the executable is present on data appliance 102. A signature, if present, can indicate that the executable is known to be malicious. (In some embodiments, signatures are used to indicate that files are safe instead of, or in addition to being used to indicate malice, and the techniques described herein adapted accordingly). In some embodiments, if no signature for the executable is found, data appliance 102 is configured to provide the executable to a virtual machine server, such as is provided by cloud security service 122, for analysis.

Virtual machine server 124 is configured to execute the executable in one or more virtual machines 126-128. If the executable is ultimately determined to be malicious, cloud security service 122 can be configured to generate a signature for the file and disseminate it both to appliance 102 and to other appliances such as appliance 140.

Figure 2:
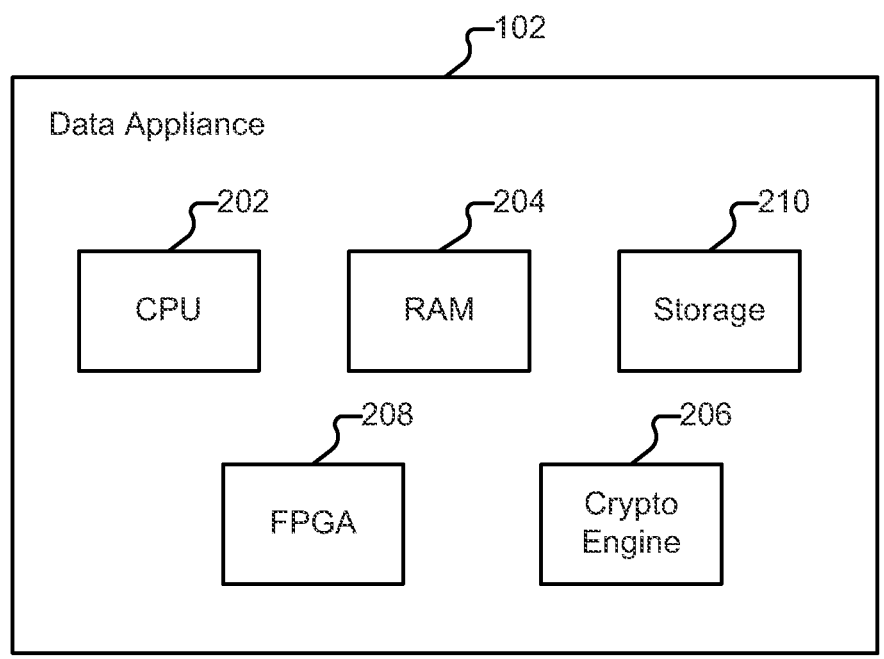
FIG. 2 illustrates an embodiment of a data appliance.

FIG. 2 illustrates an embodiment of a data appliance. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store signatures, policies, and other configuration information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Appliance 102 can take a variety of forms. For example, appliance 102 can be a dedicated device or set of devices. The functionality provided by appliance 102 can also be integrated into or executed as software on a general purpose computer, a computer server, a gateway, and/or a network/routing device. For example, in some embodiments services provided by data appliance 102 are instead (or in addition) provided to client 104 by software executing on client 104.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable.

Figure 3:
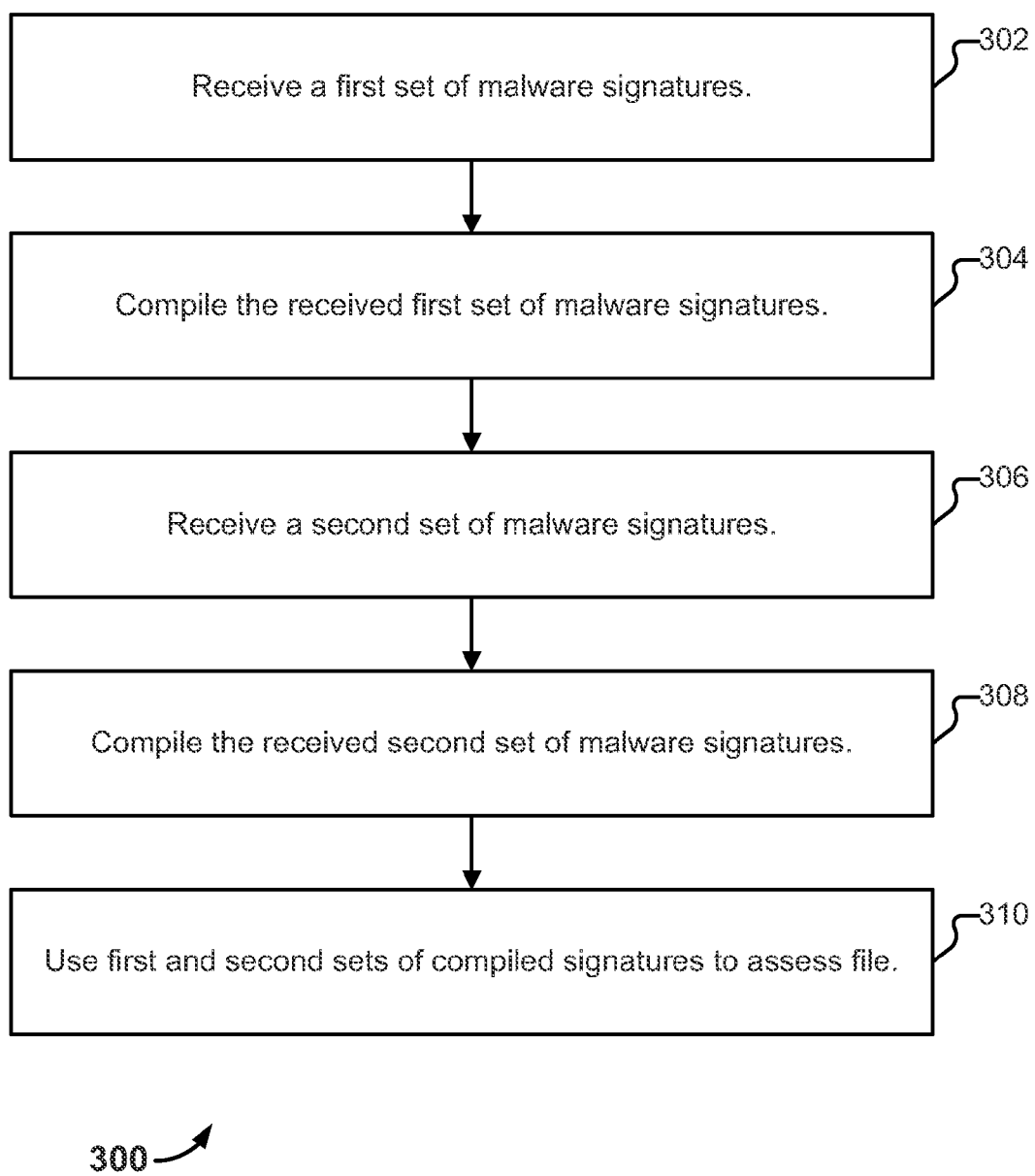
FIG. 3 illustrates an embodiment of a process for compiling and using signatures.

FIG. 3 illustrates an embodiment of a process for compiling and using signatures. In some embodiments, process 300 is performed by appliance 102. The process begins at 302 when a first set of malware signatures is received. As one example, a first set of signatures is received by appliance 102 at 302 when update server 134 sends a daily malware signature update. Data appliance 102 can also be configured to pull signatures from server 134 on a periodic basis, instead of or in addition to receiving signatures from server 134 as a push operation. As explained above, the signature update from server 134 includes one million signatures in some embodiments. At 304, the signatures received at 302 are compiled. As an example, when appliance 102 receives the signatures at 302, it stores them in storage 210 (e.g., in a directory or other area allocated to signatures received from update server 134). Appliance 102 compiles the signatures and loads them into an allocated area of RAM 204, where they become available for use in scanning.

In some embodiments, portion 304 of process 300 occurs immediately after (e.g., in response to) the processing performed at 302. In other embodiments, portions 302 and 304 of the process are not linked, or otherwise occur asynchronously. As one example, new signatures might be received by appliance 102 at any time during a window of 20:00 and 23:59, while the appliance may be configured to always recompile the rules received at 302 at 01:00.

At 306, a second set of malware signatures is received. As one example, a second set of signatures is received by appliance 102 at 306 when cloud security service 122 sends one of its twice-hourly updates. Such signatures can be pushed by cloud security service 122 and can also be requested by appliance 102. In some embodiments, cloud security service 122 provides (whether via push or pull) the signature updates to update server 134, and update server 134 coordinates sending both sets (i.e., and 302 and 306) to appliance 102. As explained above, the signature update includes one hundred thousand signatures in some embodiments. At 308, the signatures received at 306 are compiled. As an example, when appliance 102 receives the signatures at 306, it stores them in storage 210 (e.g., in a directory or other area allocated to signatures it receives from service 122). Appliance 102 compiles the signatures and loads them into an allocated area of RAM 204, where they become available for use in scanning. As with signatures received from update server 134, in some embodiments, portion 308 occurs immediately after (e.g., in response to) the processing performed at 306. In other embodiments, portions 306 and 308 of the process are not linked, or otherwise occur asynchronously.

Compiling signatures, particularly many signatures, can be a resource-intensive process. As one example, compiling one million signatures (e.g. at 304) may take appliance 102 twenty minutes, during which time appliance 102 may not be able to evaluate files, and/or may be otherwise operating at reduced functionality. In contrast, compiling one hundred thousand signatures (e.g., at 308) may only take appliance 102 thirty seconds. One option for signature compilation would be to compile the signatures together into a single set, and to recompile signatures whenever an update to either signature set is received. Unfortunately, if signatures are received every thirty minutes, and compiling the entire collection of signatures takes approximately twenty minutes (during which at least some of appliance 102's services will be unavailable), the loss of service will likely be unacceptable—particularly during typical work hours. A second option for signature compilation would be to recompile signatures whenever doing so is unlikely to impact user experience (e.g. only between the hours of midnight and 08:00). In this scenario, sat least some of the benefit of having frequent updates throughout the day (e.g., at noon) will be lost.

In some embodiments, the compilation of the one million signatures (received at 302) is performed at one time, such as 04:00, when users of network 110 will be minimally impacted. The compilation of the one hundred thousand signatures (e.g., at 308) can be performed at any time (and frequently), including during peak business hours (e.g., 08:00-18:00) with minimal user impact.

Portions 302-308 of process 300 describe the obtaining and compilation of signatures. As explained above, the signatures are ultimately used by appliances, such as appliance 102, to evaluate files. Accordingly, at 310, a determination of whether a file is malicious is made, using the compiled signatures.

One example of the processing performed at 310 is as follows. Suppose a nefarious user of client 120 has created a malicious file 130. As of 08:00 January 1, malicious file 130 is unknown to either server 134 or service 122 (i.e., neither signature source includes a signature for file 130). The nefarious user sends an email to a user of device 142 (including file 130 as an attachment) at 09:00. Device 142 is protected by data appliance 140 (which also receives and compiles signatures from server 134 and service 122). Prior to allowing file 130 to be delivered to device 142, appliance 140 scans the file. Since appliance 140 does not have a signature for file 130, no match is found. Appliance 140 sends a copy of file 130 to cloud service 122 for further analysis at 09:15. Suppose, after executing file 130 in virtual machine 126, service 122 determines file 130 is malicious. Service 122 instructs data appliance 140 that the file is malicious, and also generates a signature for file 130. At 09:30 (i.e., the next time service 122 sends out updated signatures), service 122 includes a signature for file 130 in the set of signatures it sends to appliance 102 (e.g., those received at 306). In some embodiments, service 122 also sends the newly created signature to update server 134, which will include the signature in its next batch of signatures (i.e., those it sends on January 2).

Appliance 102 compiles the signatures it newly received from service 122 (e.g., at 308) and within a few seconds, the signature associated with file 130 will be available for scanning against on appliance 102. Thus, if at 10:00 January 1 the nefarious user of client 120 attempts to email file 130 to a user of client device 104, appliance 102 will be able to detect the malicious file and prevent it from reaching device 104, because appliance 102 will have the signature. (Thus, in some embodiments, appliance 102 will not need to wait until the following day, when it receives the signature from update server 134.) The scanning can be performed on appliance 102 in a variety of ways, described in more detail in conjunction with the description of FIG. 4.

Figure 4:
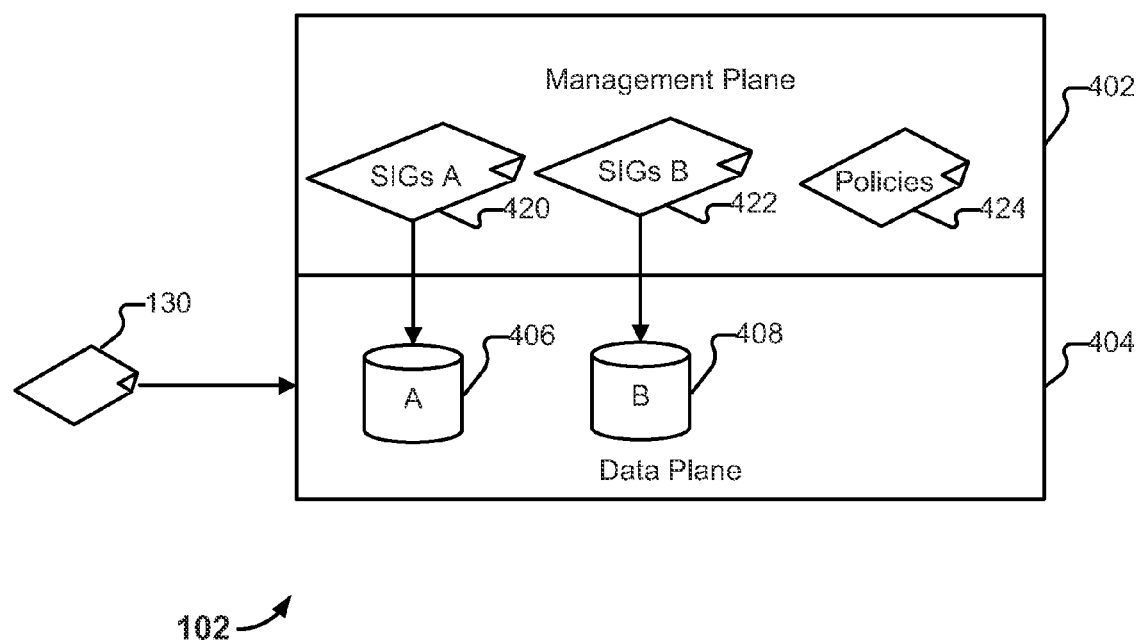
FIG. 4 is a functional diagram of logical components of a data appliance for a malware analysis system in accordance with some embodiments.

FIG. 4 is a functional diagram of logical components of a data appliance for a malware analysis system in accordance with some embodiments. The example shown is a representation of logical components that can be included in data appliance 102. As shown, data appliance 102 includes a management plane 402 and a data plane 404. In some embodiments, the management plane is responsible for managing user interactions, such as by providing a user interface for configuring policies and viewing log data. The data plane is responsible for managing data, such as by performing packet processing and session handling.

As shown in FIG. 4, signatures 420-422 are received (e.g., from update server 134 and cloud security service 122, respectively) and stored in the management plane 402. Additional signatures can also be received and stored. As one example, appliance 102 may be configured to receive weekly content updates (e.g., including URL block lists), from update server 134 or from another server. As explained above, the received signatures can be independently compiled and committed (i.e., pushed to the data plane from the management plane, as indicated by lines 406 and 408). Also as explained above, the compiled signatures occupy different portions of memory. Accordingly, in some embodiments, two different lookups are performed to determine whether a given file is malicious.

When a file, such as file 130, is received by appliance 102 for processing, lookups using signature set 406 and signature set 408 can be performed in sequence, or in parallel. For example, in some embodiments, a lookup is performed in compiled set 420 (associated with the one million signatures) first. If a match is found (indicating that file 130 is malicious), no further scanning is performed (i.e., signature set 408 is not queried). One reason to perform this lookup first is that, because set 406 represents one million signatures, the lookup is more likely to find a match (if present). In other embodiments, a match is checked against set 422 first (e.g., because the recently added signatures may be more threatening), and only if no match is found is set 420 checked. In yet other embodiments, matches are checked for by appliance 102 against both signature sets, in parallel. A variety of techniques can be used to perform the queries. For example, in some embodiments, bloom filters are used for lookups of one or both of the signature sets. In other embodiments, binary search is used—in conjunction with, or instead of using bloom filters.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
    a set of one or more interfaces configured to:
        receive, from a first remote server, a first set of malware signatures; and
        receive, from a second remote server, a second set of malware signatures;
        a set of one or more processors configured to:
        compile the received first set of malware signatures at a first time and load a compiled first set into a first area of RAM;
        compile the received second set of malware signatures at a second time that is different from the first time and load a second compiled set into a second area of RAM;
        perform a scan using at least one of: information stored in the respective first and second areas of RAM;
        determine, based at least in part on a result of the performed scan that a file is malicious; and in response to the determination that the file is malicious, prevent the file from reaching a device; and a memory coupled to the processor and configured to provide the processor with instructions.

2. The system of claim 1 wherein performing the scan includes determining that a signature of the file is not matched, using information stored in the first area of RAM, and in response, determining that the signature is matched using information stored in the second area of RAM.

3. The system of claim 1 wherein performing the scan includes determining that a signature of the file is matched, using information stored in the first area of RAM, and in response, providing as output an indication the file is malicious, without determining whether the signature is matched using information stored in the second area of RAM.

4. The system of claim 1 wherein determining that the file is malicious includes independently determining that a signature of the file is matched using information stored in the respective first and second areas of RAM.

5. The system of claim 1 wherein receiving of the first set of malware signatures and the compiling of the first set of signatures is performed asynchronously.

6. The system of claim 1 wherein the first and second sets of signatures are received at respective different times.

7. The system of claim 1 wherein the first and second sets of signatures are received at respective different time intervals.

8. The system of claim 1 wherein the set of one or more interfaces is further configured to receive an update to the second set of malware signatures, and wherein the set of one or more processors is configured to compile the received update, without compiling the first set of malware signatures.

9. The system of claim 1 wherein the malware signatures comprise virus signatures.

10. A method, comprising:
    receiving, from a first remote server, a first set of malware signatures;
    compiling the received first set of malware signatures at a first time and loading a compiled first set into a first area of RAM;
    receiving, from a second remote server, a second set of malware signatures;
    compiling the received second set of malware signatures at a second time that is different from the first time and loading a second compiled set into a second area of RAM;
    performing a scan using at least one of: information stored in the respective first and second areas of RAM;
    determining, based at least in part on a result of the performed scan that a file is malicious; and
    in response to the determination that the file is malicious, preventing the file from reaching a device.

11. The method of claim 10, wherein performing the scan includes determining that a signature of the file is not matched, using information stored in the first area of RAM, and in response, determining that the signature is matched using information stored in the second area of RAM.

12. The method of claim 10, wherein performing the scan includes determining that a signature of the file is matched, using information stored in the first area of RAM, and in response, providing as output an indication the file is malicious, without determining whether the signature is matched using information stored in the second area of RAM.

13. The method of claim 10, wherein determining that the file is malicious includes independently determining that a signature of the file is matched using information stored in the respective first and second areas of RAM.

14. The method of claim 10, wherein the first and second sets of signatures are received at respective different times.

15. The method of claim 10, wherein the first and second sets of signatures are received at respective different time intervals.

16. The method of claim 10, further comprising receiving an update to the second set of malware signatures, and compiling the received update, without compiling the first set of malware signatures.

17. The method of claim 10, wherein performing the scan includes using at least one bloom filter.

18. A computer program product embodied in a non-transitory computer readable storage medium and comprising computer instructions for: receiving from a first remote server, a first set of malware signatures;
    compiling the received first set of malware signatures at a first time and loading a compiled first set into a first area of RAM;
    receiving, from a second remote server, a second set of malware signatures;
    compiling the received second set of malware signatures at a second time that is different from the first time and loading a second compiled set into a second area of RAM;
    performing a scan using at least one of: information stored in the respective first and second areas of RAM;
    determining, based at least in part on a result of the performed scan that a file is malicious; and
    in response to the determination that the file is malicious, preventing the file from reaching a device.

* * * * *